United States Patent [19]

Ney et al.

[11] Patent Number: 5,784,472
[45] Date of Patent: Jul. 21, 1998

[54] PROCESS AND CIRCUITRY FOR THE SUPPLYING OF LOUDSPEAKERS AND OTHER ELECTRICAL CONSUMERS IN VEHICLE DOORS WITH SIGNALS

[75] Inventors: Joachim Ney, Niefern; Norbert Normann, Niefren-Öschelbronn; Gunter Lothar Schulze, Ispringen; Günther Uhl, Sinsheim, all of Germany

[73] Assignee: Doduco GmbH + Co. Dr. Dugene Durrwachter, Pforzheim, Germany

[21] Appl. No.: 367,257

[22] PCT Filed: Jul. 7, 1993

[86] PCT No.: PCT/EP93/01757

§ 371 Date: Mar. 23, 1995

§ 102(e) Date: Mar. 23, 1995

[87] PCT Pub. No.: WO94/01304

PCT Pub. Date: Jan. 20, 1994

[30] Foreign Application Priority Data

Jul. 8, 1992 [DE] Germany ............ 42 22 321.0

[51] Int. Cl.$^6$ ........................................ H04B 1/00
[52] U.S. Cl. ................................... 381/86; 381/77
[58] Field of Search ..................... 381/86, 71, 80; 455/345, 334, 337

[56] References Cited

U.S. PATENT DOCUMENTS 4,176,250 11/1979 Berglind .................. 340/825.08
4,593,403 6/1986 Kishi ............................. 381/86
5,034,996 7/1991 Carey ............................. 381/86

FOREIGN PATENT DOCUMENTS 0393233 10/1990 European Pat. Off. .
0457673 11/1991 European Pat. Off. .
0519111 12/1992 European Pat. Off. .
3303011 8/1984 Germany .

*Primary Examiner*—Minsun Oh Harvey
*Attorney, Agent, or Firm*—Dvorak & Orum

[57] ABSTRACT

Control signals for electric consumers in vehicle doors and l.f. signals for loudspeakers in vehicle doors are transferred from a control apparatus (1) provided outside of the door over a common data line (42, 43) to a door module (20, 30). For this purpose, in the control apparatus (1) the control signals are modulated in binary-coded form onto a carrier signal and onto the same carrier signal there is also modulated the l.f. audio signal. In the door module 30) the signals are demodulated and separated according to frequency. The l.f. signals are amplified and fed to a loudspeaker (4, 5). The control signals are evaluated by a micro-controller (24, 34) and they control over switching stages (23, 33), setting elements (6, 7) provided in the door. Conversely there is also possible a data transfer from the door module (2, 3) to the control apparatus (1).

21 Claims, 4 Drawing Sheets

PROCESS AND CIRCUITRY FOR THE SUPPLYING OF LOUDSPEAKERS AND OTHER ELECTRICAL CONSUMERS IN VEHICLE DOORS WITH SIGNALS

The invention relates to a process and to a circuitry arrangement for the supplying of loudspeakers in vehicle doors with electrical l.f. audio signals and of further electrical consumers in the vehicle doors with control signals and with load current. In automobile doors nowadays a large number of electrical consumers are accommodated, which have to be supplied with current and electrical control signals, for example window raisers, adjustable outside mirrors, outside mirror heating, warning light, door-closing contacts, contacts for interior illumination, loud speakers, central locking, possibly also an operating unit for an electrical sliding roof. In conventional circuitry technology there are needed for this up to 40 lines. This presents, however, a considerable problem for the mounting of the doors and renders repairs to the door difficult, since the lines are not only laid in part in the door and in part in the rest of the body, but also have to be led into the respective door by means of a flexible cable harnessing. Moreover, most of the lines must conduct a load current and, therefore, must have a sufficiently large line cross section. In view of the fact that the number of electrical lines in motor vehicles has increased very strongly in the last few years (a modern middle class car contains on the order of 1000 meters of cable), the automobile manufacturers have in the meantime serious problems in accommodating cable harnessings (Kabelbäume) in the vehicle.

From EP 0,277,014 A2 it is a known practice to supply the seating places in an airplane, on the railway or in a traveling bus with video, audio, control, and state interrogation signals in the multiplex process, but over these lines there are not simultaneously transmitted load currents over the same lines to electric consumers in the seats, and difficulties such as arise in the cabling of vehicle doors are not addressed here. A similar situation is present with U.S. Pat. No. 4,176,250, from which it is a known practice to transmit exclusively control signals in the time multiplex process into vehicle doors or out of them.

From EP-A-393,233 it is a known practice to transmit measurement signals in vehicles between sensors, such as the filling state indicator in the fuel tank, the oil pressure meter in the motor housing, temperature sensors and light sensors for the headlight control and their appertaining indicating elements, an air-conditioning installation, control lights and the like together with the supply voltage for the sensors over a common line, in which the supply voltage is modulated with the measurement signals. Load currents for consumers operated by electric motors or for heating systems are just as little co-transmitted here as are audio signals.

Underlying the present invention is the problem of reducing the cabling expenditure arising for vehicle doors.

This problem is solved by a process with the features given in claim 1 and by a circuitry arrangement with the features given in claim 10. Advantageous further developments of the invention are the object of the dependent claims.

According to the invention the control signals and l.f. audio signals to be transmitted into a door are modulated outside the door onto a common carrier signal and transferred on this carrier over a data line into the door, separated there according to audio and control signals and conducted onward to their predetermined consumers. Furthermore, the carrier signal is rectified in the door and used for the current supply of the consumers provided in the door. There the transfer of the control signals occurs purposefully in the form of a serial data bus.

Transmitting control signals in the form of a serial data bus is already known per se in automobile technology, for example in the electronic motor control, but not yet for the transmission of control signals into a door. According to the invention, however, not only control signals are transmitted as serial data bus, but their transmission combines with the transmission of l.f. audio signals which are modulated for this purpose in common with the control signals onto a common carrier. For this there is used in the vehicle outside of the door a bus-control apparatus which generates and transfers the modulated carrier signal, and in the door there is used for the reception of this signal a circuitry arrangement, hereinafter designated as door module in which the modulated signal is demodulated and separated into the control signals and the l.f. audio signals. From the door module, the consumers present in the door are supplied. In this manner no more than three lines must lead into the door, namely a data line from the bus control apparatus to the door module, a line for the current supply to the door modules and to the connected consumer, as well as possibly a ground line. Thereby the cabling of the doors is extremely simplified, because into the door at the most there must still lead a three-wire flexible connecting cable, which is separable by a corresponding three-wire plug connector.

It also occurs that there are switches or other operating elements in a door, with which consumers are operated which lie not in the door itself but outside the door or in another door. Thus, from the driver's door, the rearview mirror on the front-seat door (Beifahrertür) can be adjusted and/or the central locking can be actuated.

In an advantageous further development of the invention it is provided, therefore, that also control signals generated in a door, intended for electric consumers outside of the door are likewise modulated on the carrier signal and then transferred out of the door to another door module, preferably over a bus control apparatus to which all the door modules are connected. In this manner a bidirectional data traffic between the door modules and the central bus control apparatus is possible, bidirectionally, of course, only for the control signals but not for the audio signals for which that is not needed.

For the selection of the carrier signal and of the modulation process there are various possibilities. Thus it is possible to use as carrier signal, for example, a sine-form or sinusoidal alternating current signal, preferably with a frequency between 80 kHz and 120 kHz, on which the l.f. audio signals (frequency range ca. 30 H. to 18 kHZ) are modulated by frequency modulation. For the transfer of the digital control signals there is used in this part preferably also the frequency modulation, and two discrete frequencies for the symbols "0" and "1", expediently modulates on the carrier signal above the frequency band used for the audio transmission.

Another advantageous possibility lies in using a square carrier signal. If the square carrier signal is rectified in the door, there is obtained in the ideal case a gap-free direct voltage which can be drawn upon without great expenditure for the current supply of the consumer in the door. In this case the carrier signal fulfills a double function: For one, it serves as information carrier, and in the second place it transfers the energy which the consumers in the door need in order to operate. A separate line for the energy transfer can, therefore, be omitted. The square carrier signal can be frequency-modulated or also amplitude-modulated; preferably it is pulse-width modulated in order to transmit the l.f. audio signals. The maximal modulation stroke required therefor can be realized by change of the keying ratio (Tastverhältnisses) from 0.7 to 1.3. Also with use of a rectangular carrier signal there is preferred a frequency of approximately 80 kHz to 120 kHz for the carrier signal. Therewith the sample frequency is roughly 10 times as high as the l.f. audio frequency, which is more than sufficient for a faultless l.f. transmission. The high sample frequency makes possible an especially simple modulation and demodulation.

In the case of a square carrier signal the binary-coded control signals are impressed preferably by amplitude modulation. For this the square voltage course of the carrier signal is used during one period, preferably as "empty frame" ("Leer-Rahmen"), for a bit to be transmitted out of a series of bits. There, as is still described further along (hinten), there is easily possible a coding of four different stages in each transmission period.

A novel, advantageous type and manner of wireless signal transmission between the bus control apparatus and the door module is the object of the patent application filed on the same date with the title "Process and circuitry for the supplying of electrical consumers on swingable carriers with electric current and/or other electrical signals," to which reference is herewith made.

An example of execution of the invention is represented in the appended schematic drawings.

Figure 1:
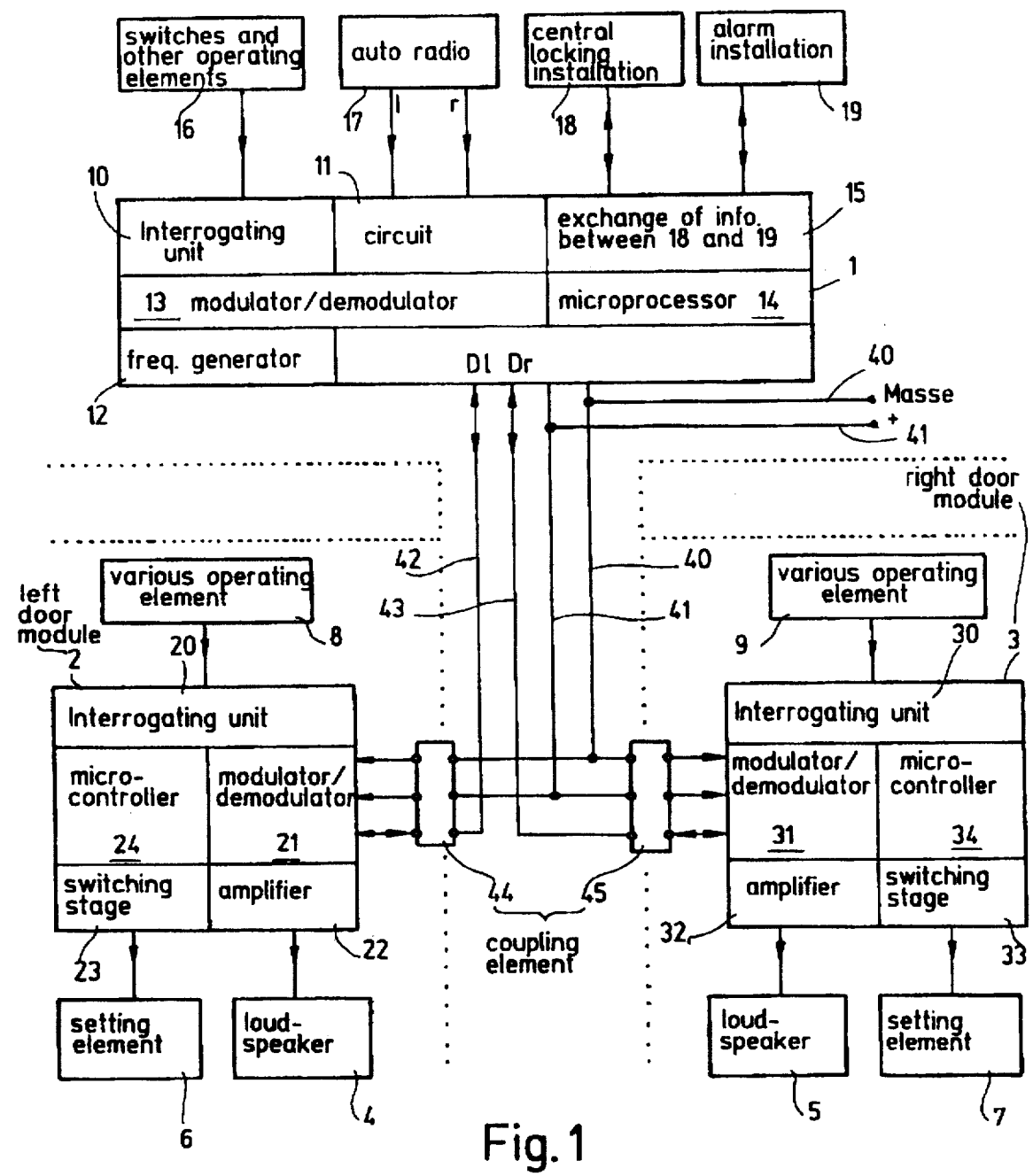
FIG. 1 is a block circuit diagram of a circuitry arrangement for the supplying of loudspeakers and other electric consumers in vehicle doors.

The circuitry arrangement in FIG. 1 contains a bus control apparatus 1, which is arranged in the vehicle at a place outside of the doors, for example, behind the dashboard, as well as a door module 2 in a left door and a door module 3 in a right door. Both doors contain a loudspeaker 4 and 5, respectively, and setting elements 6 and 7, respectively, for different consumers, especially for the adjustment of the outside mirror, for window raisers and for a central locking. Furthermore, various operating elements 8 and 9 are mounted on each door.

The bus control apparatus 1 contains an interrogating unit (Abfrageeinheit) 10 for the interrogating of the position of switches and other operating elements 16 arranged outside of the doors, a circuit 11 connected with an auto radio 17 for the feeding-in of the l.f. audio signals delivered on two channels (right and left stereo channel(s)) of the auto radio 17, a frequency generator 12 for generating an alternating-voltage carrier signal with the frequency of ca. 100 kHz, a modulator/demodulator (13) (Modem), a microprocessor 14 controlling the run-offs in the bus control apparatus and a circuit 15 for the exchange of information between the bus control apparatus and a central locking installation 18 and an alarm installation 19.

The door modules likewise contain an interrogating unit 20 and 30, respectively, for the interrogating of the position of switches and other operating elements in the respective door, a modulator/demodulator 21 and 31 (Modem), a l.f. amplifier 22 and 32, respectively, switching stages (Schaltstufen) 23 and 33, respectively, for the conversion of the demodulated control signals into setting signals for setting elements 6 and 7 of electric consumers provided in the respective door, as well as, finally, a micro-controller 24 and 34, respectively, which controls the processes in the door modules 20 and 30, respectively.

Both the bus control apparatus 1 and also the door modules 2 and 3 are connected over a ground line 40 and a line 41 conducting voltage opposite to a current source (vehicle battery). Moreover, from a data output D1 of the bus control apparatus 1 a data line 42 leads into the left door and from a data output Dr a data line 43 leads into the right door. The two lines 40 and 41 for the current supply and the data lines 42 and 43 are led over a coupling element 44 or 45, respectively, into the door. With the coupling elements 44 and 45 it can be a matter of a three-wire plug connector with the appertaining three-wire flexible connecting cables.

The circuitry operates as follows:

By the interrogation unit 10 of the bus control apparatus 1 the allocated operating elements 16 are cyclically interrogated; binary-coded control signals which correspond to the switching positions determined by the interrogation are modulated by the modem 13 onto the carrier signal delivered from the frequency generator 12 and transmitted according to the coded determination into the right door or into the left door or into both doors. When the auto radio is switched on the l.f. signals coming from the auto radio and intended for the door loudspeakers 4 and 5 are fed into the bus control apparatus 1 and likewise modulated by the modem 13 onto the carrier signal, in which arrangement in the case of stereo signals the left channel is transmitted over the data line 42 to the door module 2, and the right channel is transmitted over the data line 43 to the door module 3. In the case of mono-l.f. signals, corresponding l.F. signals are transmitted from the data lines 42 and 43.

The signals arriving in the door modules are received, demodulateD in the modem 21 or 31, respectively, and separated according to frequency. The l.f. signals are amplified by a l.f. amplifier 22 or 32, respectively, and transmitted to the door loudspeakers 4 and 5, respectively. The demodulated control signals are evaluated by the micro-controllers 24 and 34, respectively, and THEY control, over switching stages 23 and 33, the various setting elements 6 and 7, respectively.

The interrogation units 20 and 30 in the two door modules 2 and 3 interrogate cyclically on their part the position of the operating elements 8 and 9 provided in the same door and deliver binary-coded control signals which represent (wiedergeben) the positions called (abgefrage). The micro-controller 24 or 34, respectively, checks whether the called operating element belongs to a setting element in the same door; if it belongs to a setting element in the same door, the setting element is driven by the respective control signal without detour over the bus control apparatus 1 over the switching stage 23 or 33. If, for example the interrogated operating element 8 of the left door belongs to a setting element 7 in the right door, then the binary-code control signal delivered from the interrogation unit 20 is modulated in the modem 21 onto the carrier signal, transferred into the bus control apparatus 1, demodulated there, evaluated (bewertet), again modulated onto the carrier signal and transferred into the right door, demodulated there in the modem 31 and it controls, over the switching stage 33, the setting element 7.

The bus control apparatus 1, further receives signals, for example, from the baggage trunk lock, which is a component of the central locking 18, and conduct them onward to the two door modules 2 and 3. Furthermore, from the door modules over the bus control apparatus 1 signals can be conveyed to an alarm installation 19 and, conversely, from the alarm installation to the door modules 3 and 4.

Figure 2:
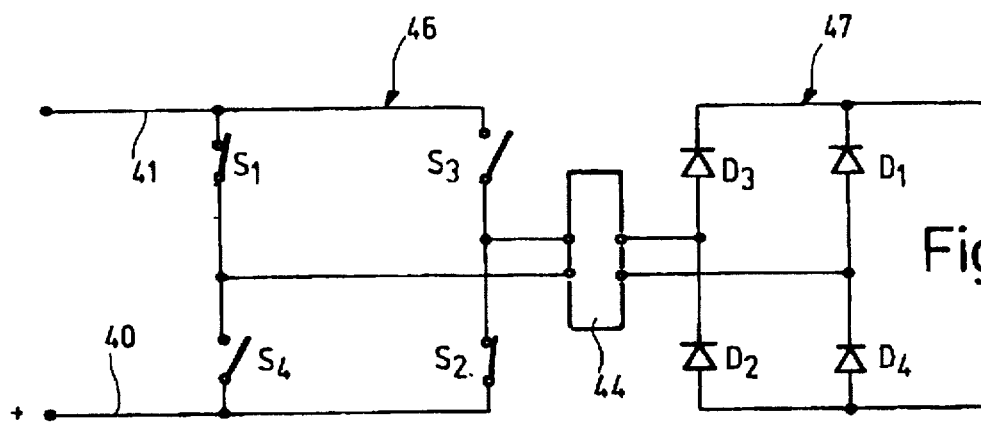
FIG. 2 shows as a detail to the block circuit diagram of FIG. 1 a circuitry arrangement for energy transfer by means of the carrier signal.
Figure 3:
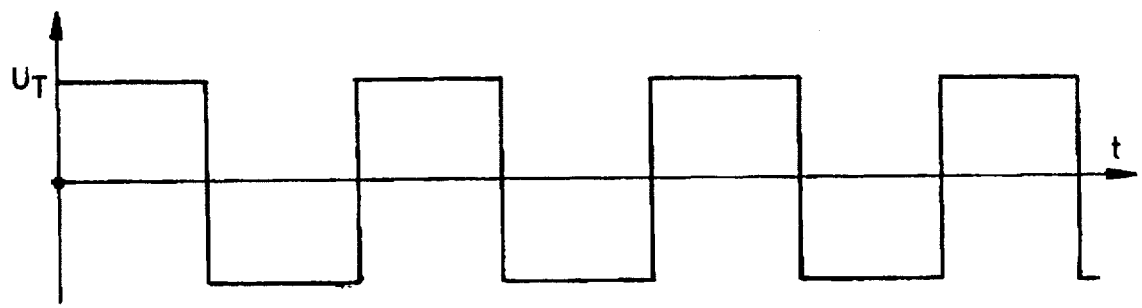
FIG. 3 shows for this the course of the voltage of a square (rechteckförmigen) carrier signal.
Figure 4:
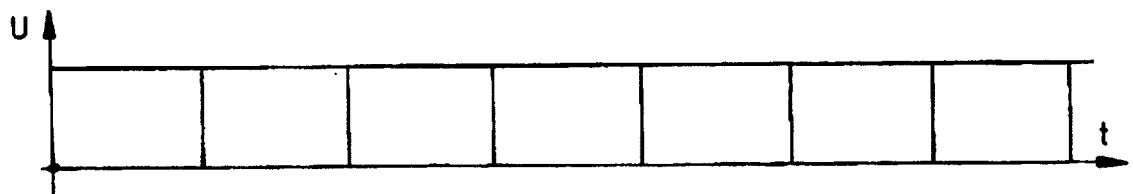
FIG. 4 shows the direct voltage obtained by rectification of the carrier signal from FIG. 3 for the supplying of the consumers in the door.

As carrier signal there is preferably used a high-frequency, rectangular alternating-voltage signal, such as is represented in FIG. 3. Such a carrier signal can easily be generated from the battery voltage present in the vehicle according to FIG. 2 by a bridge circuit 46: four rapid electronic switches S1, S2, S3 and S4 are switched together into a bridge 46, which is fed over the lines 40 and 41 from the vehicle battery. Either the switches S1 and S2, or the switches S3 and S4 are closed, and that in alternation (Wechsel), so that on the input terminals of the coupling element 44 (or 45) there appears the square voltage represented in FIG. 3, which is rectified in the door module 2 (or 3) by a rectifier bridge 47, consisting of the diodes D1 to D4, and yields the direct voltage represented in FIG. 4, which, in the ideal case is free of gaps (lückenfrei). The smoothing expenditure for this direct voltage is restricted to the bridging of the needle-shaped voltage incursions arising through the finite (endliche) switching flank steepness. The rectifier .bridge 47 serves as current source for the supplying of the consumers in the door.

Figure 5:
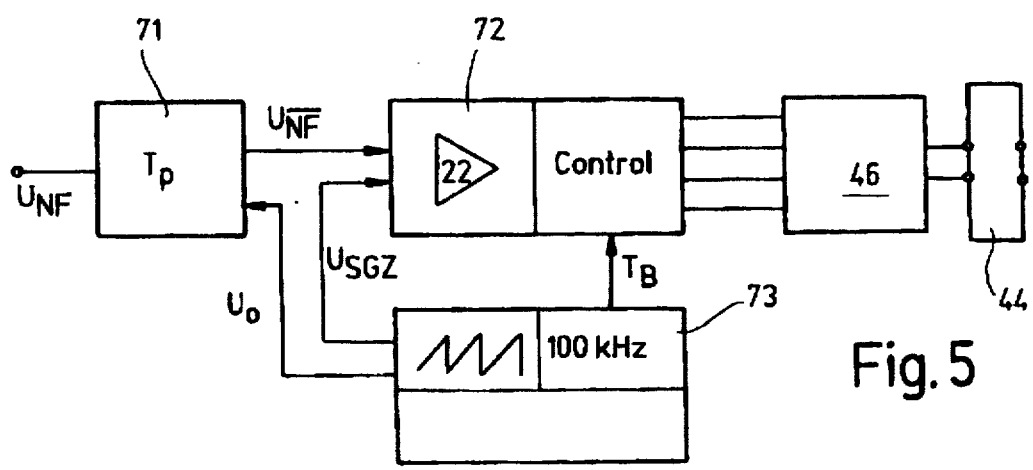
FIG. 5 shows as a detail to the block circuit diagram according to FIG. 1 a circuitry arrangement in block representation for the transfer of a l.f. audio signal.
Figure 6:
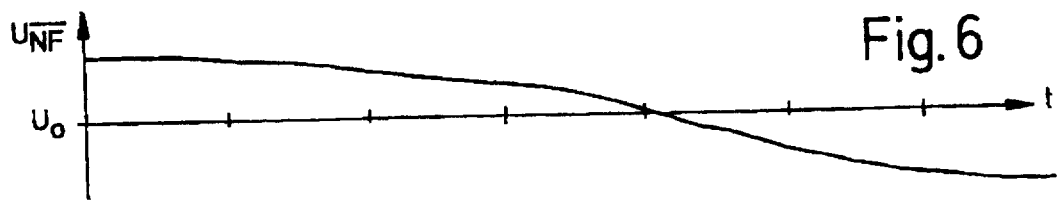
FIG. 6 shows the time course of an l.f audio signal.
Figure 7:
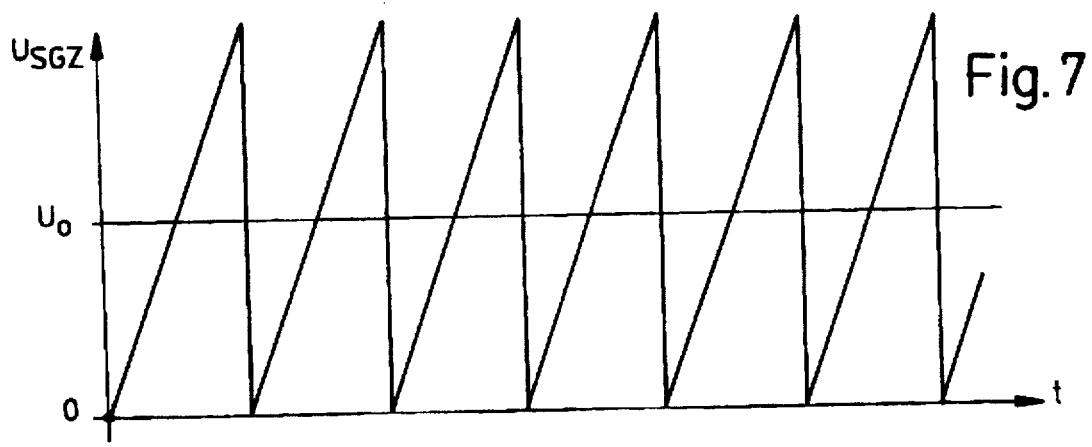
FIG. 7 shows a sawtooth voltage with which the l.f. audio signal according to FIG. 6 is sampled.
Figure 8:
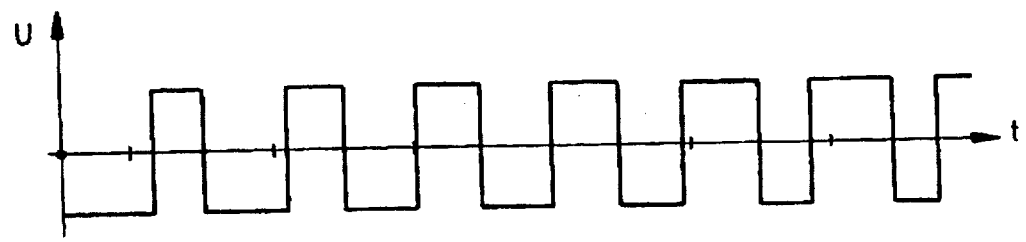
FIG. 8 shows the pulse-width modulated square signal recovered as the result of scanning the l.f. audio signal.

The transmission of a l.f. audio signal can occur by modulation of the keying ratio (Tastverhältnisses) of the square carrier signal represented in FIG. 3, which has for this purpose a frequency on the order of 100 kHz. For this there serves the circuit represented in FIG. 5: The l.f audio signal is fed to a low-pass filter 71, thereby limited in its band width and amplitude and, for the setting-in of a suitable working point, added to a constant direct voltage $U_O$. The l.f. direct voltage signal $U_{RF}$ arising in this manner is represented in FIG. 6. Between the low-pass filter 71 and the bridge circuit 46 (see FIG. 2) there is located a control circuit 72 for the bridge circuit 46, which determines when the switches S1-and-S2 and S3-and-S4, respectively, switch over (umschalten). For this there is provided, further, a beat generator 73, which delivers a 100 kHz signal to the control circuit 72. In this 100 kHz beat there are closed, for example, the switches S1 and S2 and simultaneously the switches S3 and S4 are open. If within the period of the beat generator 73 the switches S1 and S2 are opened and, instead, the switches S3 and S4 are closed, then by scanning of the signal according to FIG. 6 by the sawtooth voltage $U_{SGZ}$ represented in FIG. 7 it is determined which has the monopolar amplitude $2U_O$ as well as the frequency 100 kHz and is likewise generated by the beat generator 73. The sawtooth voltage $U_{SGZ}$ is compared in the control circuit 72 with the l.f. voltage $U_{RF}$. The comparison is started with the beginning of each period of the beat generator 73; as soon as the sawtooth voltage has reached the actual voltage value $U_{NF}$ the bridge circuit 46 is pole-reversed (umgepolt); with the start of the next period of the beat generator the bridge 46 is again pole-reversed. Therewith the amplitude value $U_{NF}$ is coded into the scanning (keying) ratio, the carrier signal modified in its pulse width in this manner is represented in FIG. 8.

Figure 10:
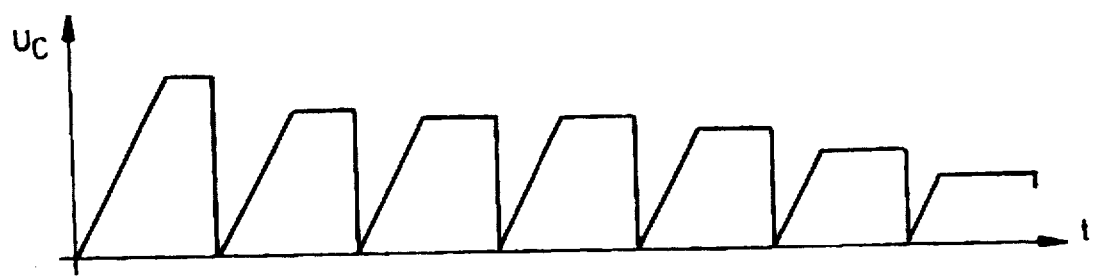
FIG. 10 shows a sequence of direct-voltage impulses which are recovered by the circuitry arrangement in FIG. 9 and the amplitude of which mirrors the scanning ratio of the square signal from FIG. 8.
Figure 11:
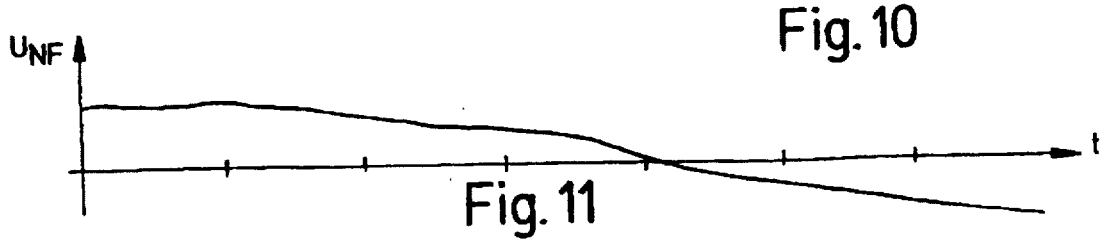
FIG. 11 shows the course of a l.f. audio signal which was recovered by low-pass filtering from the signal according to FIG. 10.
Figure 9:
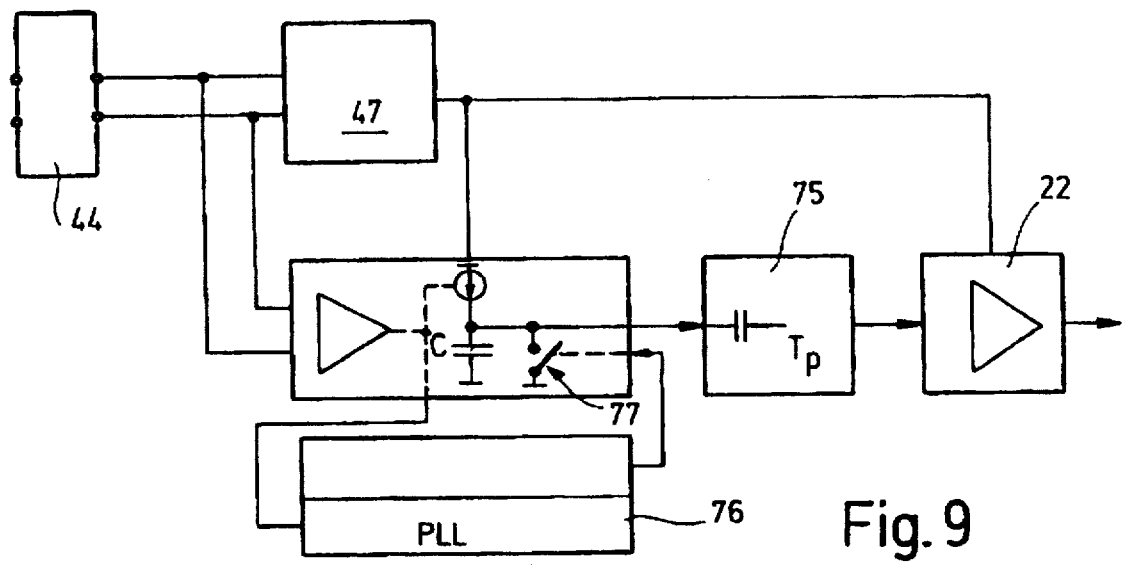
FIG. 9 shows as a detail, a circuit for the reception and for the processing of the pulse-width modulated signal from FIG. 9.

The pulse-width-modulated signal is transmitted over the coupling element 44 into the vehicle door, in which the door module 2 contains the circuit represented in FIG. 9: The bridge circuit 47 (see FIG. 2), a circuit 74 for the conversion of the scanning (keying) ratio, a low pass filter 75, a l.f. amplifier 22 and a phase-rigid control circuit 76. The keying-ratio converter 74 determines the sign of the pulse-width modulated square voltage fed to it and in the case of negative voltaage it switches a current source fed from the bridge circuit 47 in the keying-ratio converter 74 onto a capacitor C, which is charged as long as the negative half-wave of the square voltage (FIG. 8) persists; up to this time point the voltage on the capacitor C climbs linearly (FIG. 1) and then remains constant until the capacitor C is discharged at the beginning of each 100 kHz period by an electronic switch 77. For this purpose the phase-rigid control circuit locks itself (lockt sich) onto the working frequency of 100 kHz of the system and communicates to the keying ratio converter 74 the requisite control signals by which with the beginning of each 100 kHz period the capacitor C is again discharged. The voltage course on the capacitor C is represented in FIG. 10 and forms an impulse sequence, the amplitude of which is determined by the keying ratio of the pulse-width modulated square voltage in FIG. 8. The voltage $U_C$ on the capacitor C contains, besides the l.f. frequency of the audio signal, the system frequency of 100 kHZ and harmonics of the system frequency as well as a direct-voltage constituent; it is fed to an AC-coupled low-pass filter of higher order 75, which separate off the l.f. constituent and feeds it to the l.f. amplifier 22, which finally feeds the door loudspeaker 4. Also the l.f. amplifier 22 is supplied with current by the bridge circuit 47. The l.f. signal fed to it is represented in FIG. 11.

Figure 12:
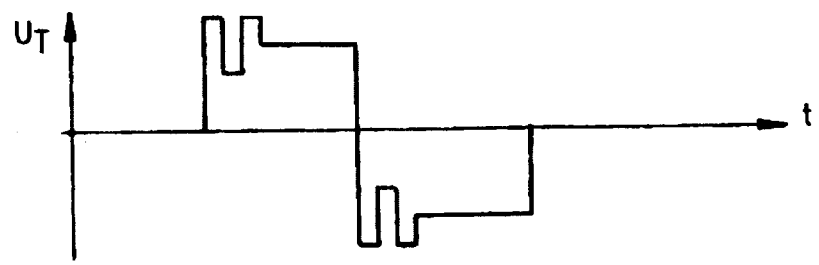
FIG. 12 shows a carrier signal modulated for the transmission of binary-coded control signals.

Commands and state information data are transmitted in the form of a sequence of binary-coded signals (data telegram). For this purpose the period of the carrier signal $U_T$ (see FIG. 3) is used as "empty frame" for a bit of the serial data telegram to be transmitted. If this "empty frame" is marked each time after a state change, then the coding of four states in each transmission period is possible—see FIG. 12:

| 1st marking | 1 not present, | marking 2 not present |
| 2nd marking | 1 present | marking 2 not present |
| 3rd marking | 1 not present, | marking 2 present |
| 4th marking | 1 present, | marking 2 present |

To improve the transmission security the code space thus given can purposefully be used redundantly:

| No transmission; | | |
| --- | --- | --- |
| 1st marking Logical 1: | 1 not present, | marking 2 not present |
| 2nd marking | 1 present | marking 2 not present |

| | -continued | |
|---|---|---|
| | No transmission; | |
| Logical 0; | | |
| 3rd marking Start-stop bit: | 1 not present, | marking 2 present |
| 4th marking | 1 present, | marking 2 present |

Such marking can be emplaced in the form of an h. f signal with a frequency of several MHz (h.f. burst) upon the square pulses and the modem 21 or 31 in the door module 2 or 3, respectively restores the data telegram transmitted in this manner.

We claim:

1. A process for supplying loudspeakers within vehicle doors with electric low frequency audio signals, and for supplying other electrical consumers within the vehicle doors with control signals and with electric power, which said control signals are generated within the vehicle but not within the doors thereof, comprising the steps of:

providing a common carrier signal;

modulating the audio and control signals onto said carrier signal, the modulation being performed within the vehicle but not within the doors;

transmitting the said modulated carrier signal over a data line into the doors;

separating in frequency, the audio signal from the control signals;

rectifying the carrier signal received within the door into a current source used for supplying the other electrical consumers provided in the door with electric power;

conducting the audio signals to the loudspeakers;

and conducting the control signals to the other consumers provided inside said door so that they are operated by the electric power in accordance with the received control signals.

2. The method according to claim 1, wherein a square carrier signal is used.

3. The method according to claim 1, wherein the carrier signal is frequency-modulated.

4. The method according to claim 1, wherein the carrier signal in pulse-width modulated in order to transmit the audio signals at low frequencies.

5. The method according to claim 1, wherein the control signals are binary-coded and transmitted as a serial data bus on the carrier signal.

6. The method according to claim 5, wherein the binary control signals are impressed on the carrier signal by amplitude modulation.

7. The method according to claim 1, further comprising the steps of generating a further control signal within the door, said further control signal intended for an electrical consumer which is disposed outside of the same door;

modulating said further control signal onto the same carrier signal and then transmitting said further signal to said consumer which is disposed outside of said door where the further control signal is recovered by separating it in frequency from the audio signals;

and then conducting the recovered control signal to the consumer which is disposed outside of said door so that said consumer is operated.

8. The method according to claim 1, wherein the carrier signal is line-bound.

9. The method according to claim 1, wherein the carrier signal has a frequency between 80 khz and 120 kHz.

10. A circuitry arrangement for supplying a loudspeaker of a vehicle door with an electrical low frequency audio signal and for simultaneously controlling a plurality of electrical consumers located within and outside of said vehicle door, comprising: a bus-control apparatus having an interrogation unit for determining a position of switches and other operating elements arranged outside of the door, with a frequency generator for the generating of a carrier signal, with a modulator for the modulating of the control signal delevered from the interrogation unit as serial data bus onto the carrier signal, with a modulator for the modulating of the low frequency audio signals fed from an auto radio onto the carrier signal and with a microprocessor for the control of the processes in the bus control apparatus, and with a circuitry arrangement provided in the door, hereinafter designated as door module, with a demodulator-and-separating stage, in which the signal transformed over a coupling element from the bus control apparatus is demodulated and separated into the control signals and low frequency audio signals, wherein in the door module there is provided a rectifier for the carrier signal and it is connected as current source with the consumers.

11. The circuitry arrangement according to claim 10, wherein said door contains an amplifier for amplifying the audio signals, and at least one switching stage for the conversion of the control signal into a respective setting signal for each of the setting elements provided in the door.

12. The circuitry arrangement according to claim 10, wherein the modulator is a frequency modulator.

13. The circuitry arrangement according to claim 10, wherein the modulator for the audio signals is a pulse-width modulator.

14. The circuitry arrangement according to claim 10, wherein the modulator for the binary-coded control signal is an amplitude modulator.

15. The circuitry arrangement according to claim 14, wherein the amplitude modulator is one of an impulse generator and frequency generator that generates an output which is added to the carrier signal.

16. The circuitry arrangement according to claim 10, wherein the door module is provided with a micro-controller for evaluating the demodulated control signals and for controlling the switching stages.

17. The circuitry arrangement according to claim 10, wherein the bus-control apparatus is connected to at least two door modules.

18. The circuitry arrangement according to claim 10, wherein the door module contains an interrogation unit that interrogates a position of the switches and operating elements that are arranged in the door and a modulator for modulating the control signals delivered from the interrogation unit onto the carrier signal, and wherein the bus control apparatus is provided with a demodulator stage wherein the modulated signal is transferred from the door module over a coupling element and is demodulated so as to recover the control signals contained therein and, controlled by the microprocessor, sent to the switching stages for the conversion of the control signals for the setting elements provided on an outside of the doors, and to the modulator for transfer to another door module.

19. A method of transmitting a multiplicity of electrical signals throughout an automobile via a common carrier signal conducted over a bidirectional data line means, said signals powering audio speakers and operating a matched multiplicity of other electrical power consumers located within said automobile, said transmission method comprising the steps of:

providing a central bus control apparatus for generating and transferring said common carrier signal along said data line means;

providing a respective door control module in each respective automobile door, said door control module being in bidirectional communication with said central bus control for receiving said common carrier signal therefrom;

activating said door module to segregate in frequency, said audio signals from said control signals;

rectifying the carrier signal in the door into a current source used for supplying the other electrical consumers provided inside the door with electric power;

conducting the audio signals to the audio speakers;

conducting the control signals to the other consumers provided inside the door so that they are operated by the electric power in accordance with the received control signals;

generating a further control signal inside the door, said further control signal intended for an electrical consumer outside of the said door;

modulating the further control signal onto said same carrier signal and transmitting the further control signal out of said door module to said central control bus and to said electrical consumer which is disposed outside of said door;

recovering said further control signal by segregating it in frequency from the audio signals and supplying the recovered control signal to the electrical consumer outside of said door to have said consumer operated;

and transferring another part of said further control signal to said loudspeakers.

20. The method of claim 19 wherein said carrier signal is a square wave voltage that is rectified in said door control module to produce a continuous current supply for all electrical power consumers located within and outside of said door.

21. The method of claim 19 wherein the means for electrical power is comprised of a wire means connected at one end to a battery of the car and at another end to the respective consumer.

* * * * *